(12) United States Patent
Arimilli et al.

(10) Patent No.: US 8,214,592 B2
(45) Date of Patent: Jul. 3, 2012

(54) DYNAMIC RUNTIME MODIFICATION OF ARRAY LAYOUT FOR OFFSET

(75) Inventors: Ravi K. Arimilli, Austin, TX (US); Donald W. Plass, Poughkeepsie, NY (US); William John Starke, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 548 days.

(21) Appl. No.: 12/424,348

(22) Filed: Apr. 15, 2009

(65) Prior Publication Data
US 2010/0268880 A1 Oct. 21, 2010

(51) Int. Cl.
*G06F 13/16* (2006.01)
(52) U.S. Cl. .......... 711/118; 710/51; 710/107; 711/119; 711/129
(58) Field of Classification Search ................ 711/118, 711/119, 129; 710/51, 107
See application file for complete search history.

(56) References Cited

U.S. PATENT DOCUMENTS

| | | | |
|---|---|---|---|
| 5,191,649 A * | 3/1993 | Cadambi et al. ........... 709/225 |
| 5,522,083 A | 5/1996 | Gove et al. | |
| 5,535,350 A * | 7/1996 | Maemura ...................... 711/3 |
| 5,946,219 A | 8/1999 | Mason et al. | |
| 6,240,502 B1 | 5/2001 | Panwar et al. | |
| 7,237,087 B2 | 6/2007 | Vorbach et al. | |
| 2001/0021941 A1 * | 9/2001 | Arakawa et al. ............. 708/514 |
| 2002/0161992 A1 * | 10/2002 | Utsumi et al. ..................... 713/1 |
| 2003/0023794 A1 * | 1/2003 | Venkitakrishnan et al. .. 710/105 |
| 2006/0277348 A1 * | 12/2006 | Wooten ........................ 710/315 |
| 2007/0180176 A1 * | 8/2007 | Pong et al. .................... 710/111 |

OTHER PUBLICATIONS

DeHon et al., "Reconfigurable Computing: What, Why, and Implications for Design Automation," 6 pages, Computer Science Division, University of California at Berkeley; DAC 99, New Orleans, LA.

Xu et al., "Runtime Reconfiguration Techniques for Efficient General-Purpose Computation," pp. 42-52, University of Rochester; 2000 IEEE.

\* cited by examiner

*Primary Examiner* — Jae Yu
(74) *Attorney, Agent, or Firm* — Yudell Isidore Ng Russell PLLC (57) ABSTRACT

Disclosed are a method, a system and a computer program product for operating a cache system. The cache system can include multiple cache lines, and a first cache line of the multiple of cache lines can include multiple cache cells, and a bus coupled to the multiple cache cells. In one or more embodiments, the bus can include a switch that is operable to receive a first control signal and to split the bus into first and second portions or aggregate the bus into a whole based on the first control signal. When the bus is split, a first cache cell and a second cache cell of the multiple cache cells are coupled to respective first and second portions of the bus. Data from the first and second cache cells can be selected through respective portions of the bus and outputted through a port of the cache system.

19 Claims, 8 Drawing Sheets

DYNAMIC RUNTIME MODIFICATION OF ARRAY LAYOUT FOR OFFSET

BACKGROUND

1. Technical Field

The present invention generally relates to superscalar processor systems. More specifically, the present invention relates to selecting data in a cache and outputting the data from the cache to be used by single instruction multiple data (SIMD) instructions.

2. Description of the Related Art

Figure 1A:
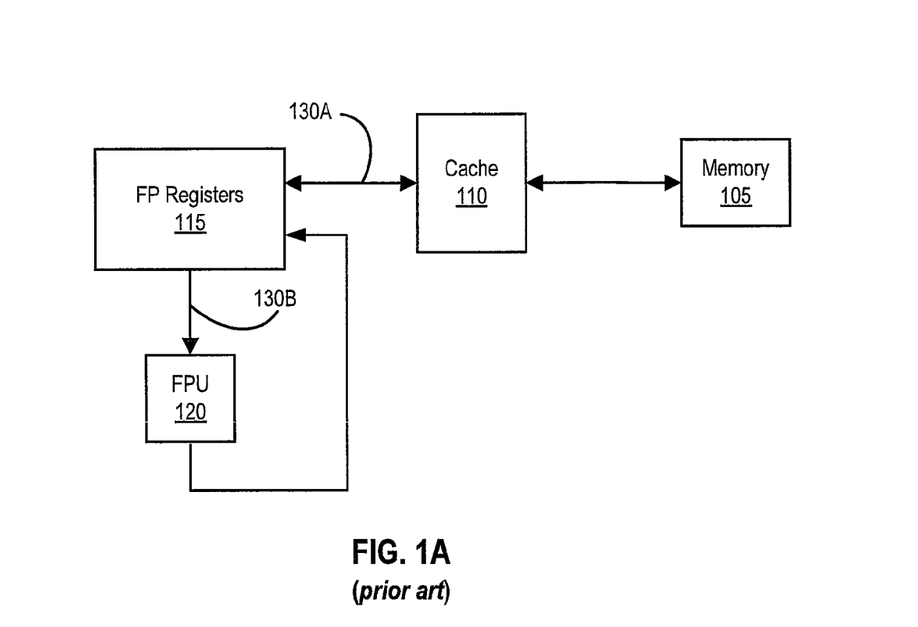
FIG. 1A provides a block diagram of a portion of a prior art processor system.

FIG. 1A illustrates a portion of a typical prior art processor system. As shown, the processor system include a memory 105 coupled to a cache 110 that is coupled to floating point registers (e.g., a register file) 115 through a bus 130A. Floating point registers are coupled a floating point unit 120 through a bus 130B. The portion of the processor system shown in FIG. 1A can only process one floating point instruction in a time period.

Figure 1B:
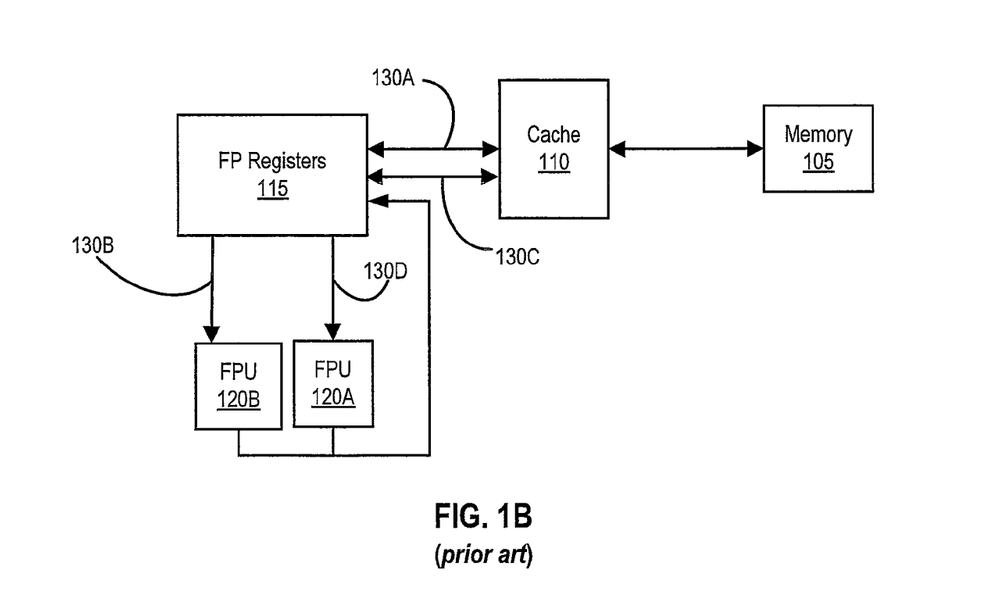
FIG. 1B provides a block diagram of a portion of a prior art superscalar processor system.

FIG. 1B illustrates a portion of a typical prior art superscalar processor system that can process two floating point instructions in a time period. As shown, the processor system includes a memory 105 coupled to a cache 110 that is coupled to floating point registers (e.g., a register file) 115 through buses 130A and 130C. Floating point registers are coupled floating point units 120B and 120A through respective buses 130B and 130D. To support processing two floating point operations in the time period, e.g., single instruction multiple data (SIMD), floating point registers must receive two floating point numbers from cache 110. Accordingly, bus 130C is used to provide the second floating point number to floating point registers 115. This additional bus increases a number of output ports for cache 110 which can increase a physical size of cache 110 implemented in a substrate, among other technical issues.

SUMMARY

Disclosed are a method, a system and a computer program product for operating a cache system. The cache system can include multiple cache lines, and a first cache line of the multiple of cache lines can include multiple cache cells, a bus coupled to the multiple cache lines, and a multiplexor coupled to the bus. In one or more embodiments, the bus can include a switch that is operable to receive a first control signal and to split the bus into a first portion and a second portion or aggregate the bus into a whole based on the first control signal. When the bus is split, for example, a first cache cell of the multiple cache cells is coupled to the first portion of the bus and a second cache cell of the multiple cache cells is coupled to the second portion of the bus, and a first input and a second input of the multiplexor are coupled respectively to the first and second portions of the bus. The multiplexer is operable to receive a second control signal and output first data from the first portion of the bus or second data from the second portion of the bus based on the second control signal. In one or more embodiments, the cache system can utilize the multiplexer to output the first data and the second data to a register file of a processor system in a serial fashion within one clock cycle of the processor system.

In one or more embodiments, the bus can include multiple one-bit bus lines, and the switch can include multiple one-bit bus line switches each corresponding to each of the multiple one-bit bus lines. Each one-bit bus line of the multiple one-bit bus lines can include a respective bus line switch of the multiple bus line switches that is operable to receive the first control signal and to split the one-bit bus line into a first portion and a second portion or aggregate the one-bit bus line into a whole based the first control signal. In one or more embodiments, each bus line switch of the multiple bus line switches can include a field effect transistor (FET) or a solid-state relay operable to receive the first control signal and to split the one-bit bus line corresponding to the bus line switch into the first portion and the second portion or to aggregate the one-bit bus line corresponding to the bus line switch into a whole based on the first control signal.

BRIEF DESCRIPTION OF THE DRAWINGS

The invention itself, as well as advantages thereof, will best be understood by reference to the following detailed description of one or more embodiments when read in conjunction with the accompanying drawings, wherein.

DETAILED DESCRIPTION

Disclosed are a method, a system and a computer program product for operating a cache system. The cache system can include multiple cache lines, and a first cache line of the multiple of cache lines can include multiple cache cells, a bus coupled to the multiple cache lines, and a multiplexor coupled to the bus. In one or more embodiments, the bus can include a switch that is operable to receive a first control signal and to split the bus into a first portion and a second portion or aggregate the bus into a whole based on the first control signal. When the bus is split, for example, a first cache cell of the multiple cache cells is coupled to the first portion of the bus and a second cache cell of the multiple cache cells is coupled to the second portion of the bus, and a first input and a second input of the multiplexor are coupled respectively to the first and second portions of the bus. The multiplexer is operable to receive a second control signal and output first data from the first portion of the bus or second data from the second portion of the bus based on the second control signal. In one or more embodiments, the cache system can utilize the multiplexer to output the first data and the second data to a register file of a processor system in a serial fashion within one clock cycle of the processor system.

In one or more embodiments, the bus can include multiple one-bit bus lines, and the switch can include multiple one-bit bus line switches each corresponding to each of the multiple one-bit bus lines. Each one-bit bus line of the multiple one-bit bus lines can include a respective bus line switch of the multiple bus line switches that is operable to receive the first control signal and to split the one-bit bus line into a first portion and a second portion or aggregate the one-bit bus line into a whole based the first control signal.

Figure 2A:
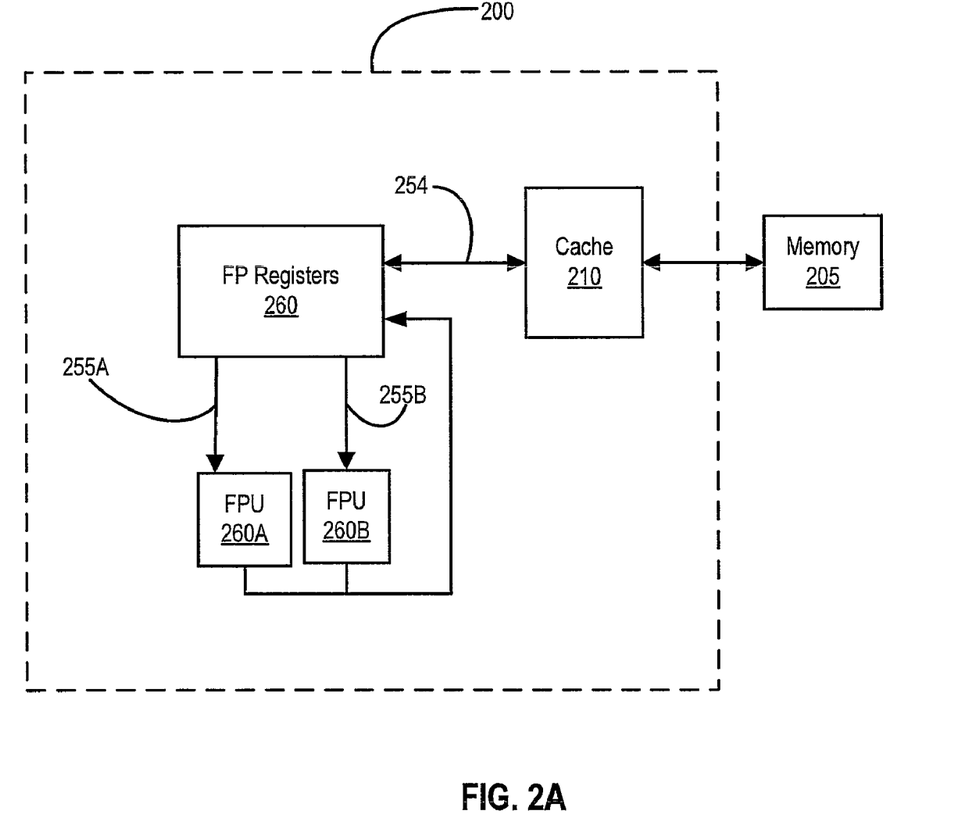
FIG. 2A provides a block diagram of a portion of a superscalar processor system, according to one or more embodiments.

Turning now to FIG. 2A, a block diagram of a portion of a superscalar processor system is illustrated, according to one or more embodiments. As shown, a portion 200 of a superscalar processor system can include a cache 210 coupled to floating point (FP) registers (e.g., a register file) 260 through a bus 254. FP registers 260 can be coupled to inputs of FP units (FPUs) 260A and 260B through respective buses 255A and 255B. Outputs of FPUs 260A and 260B can be coupled to FP registers 260. As illustrated, cache 210 can be coupled to a memory 205.

In one or more embodiments, bus 254 can be as wide as a size of a data type it can convey. For example, bus 254 can convey a FP data type (e.g., a double precision FP data type, among others). For instance, the FP data type can include a size of eight bytes, and accordingly, bus 254 can be eight bytes wide (e.g., bus 254 can include sixty-four one-bit communication lines).

Figure 2B:
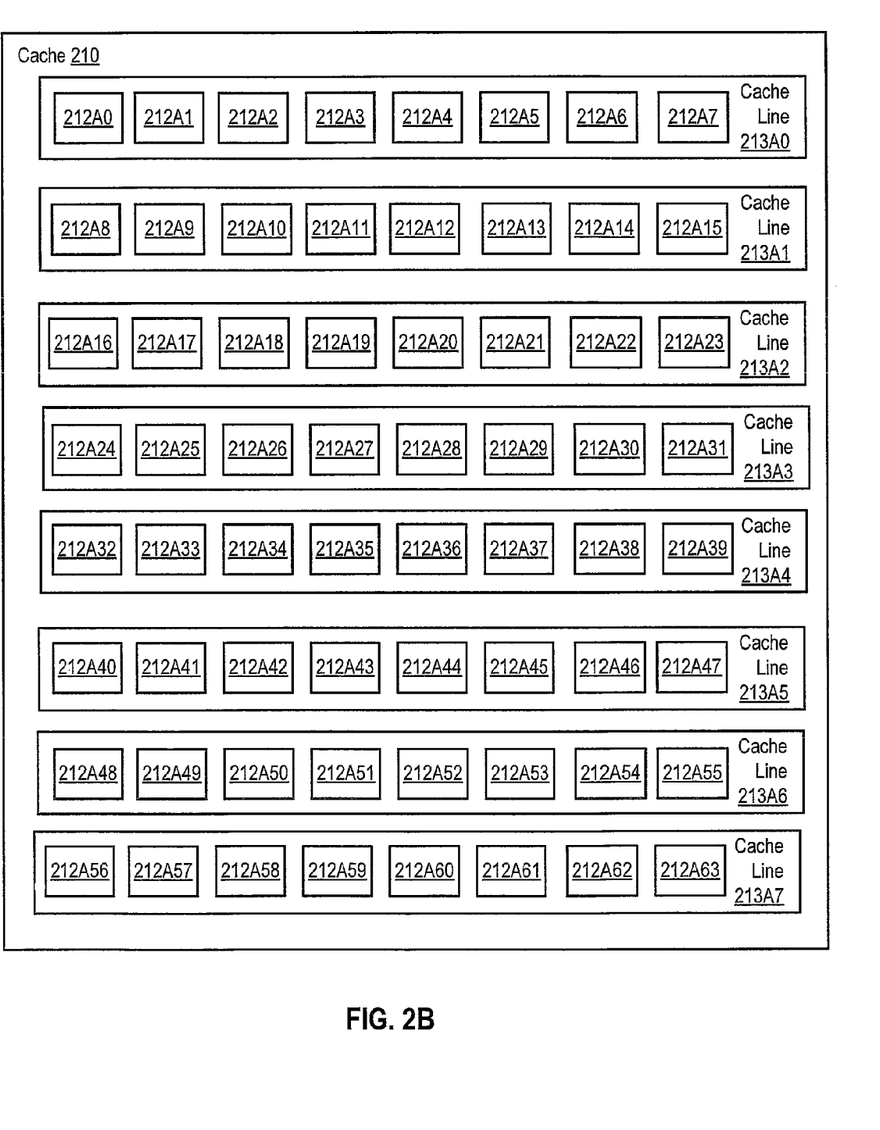
FIG. 2B provides a block diagram of a cache system, according to one or more embodiments.

Turning now to FIG. 2B, a block diagram of a cache system is illustrated, according to one or more embodiments. As shown, cache 210 can include cache cells 212A0-212A63. In one or more embodiments, a cache cell can include an amount of storage. For example, the amount of storage can include one kilobyte (1 K). For instance, each of cache cells 212A0-212A63 can include 1K of storage. In one or more embodiments, cache cells can be arranged in and/or to be accessed by cache lines. As illustrated, cache 210 includes cache lines 213A0-213A7. As shown, cache line 210A0 includes cache cells 210A0-210A7, cache line 210A1 includes cache cells 210A8-210A15, cache line 210A2 includes cache cells 210A16-210A23, cache line 210A3 includes cache cells 210A24-210A31, cache line 210A4 includes cache cells 210A32-210A39, cache line 210A5 includes cache cells 210A40-210A47, cache line 210A6 includes cache cells 210A48-210A55, and cache line 210A7 includes cache cells 210A56-210A63. In one or more embodiments, data to be transferred to FP registers 215 can be accessed by cache line and cache cell. For example, a memory address can access a cache line and one or more cache cells of the cache line.

Figure 2C:
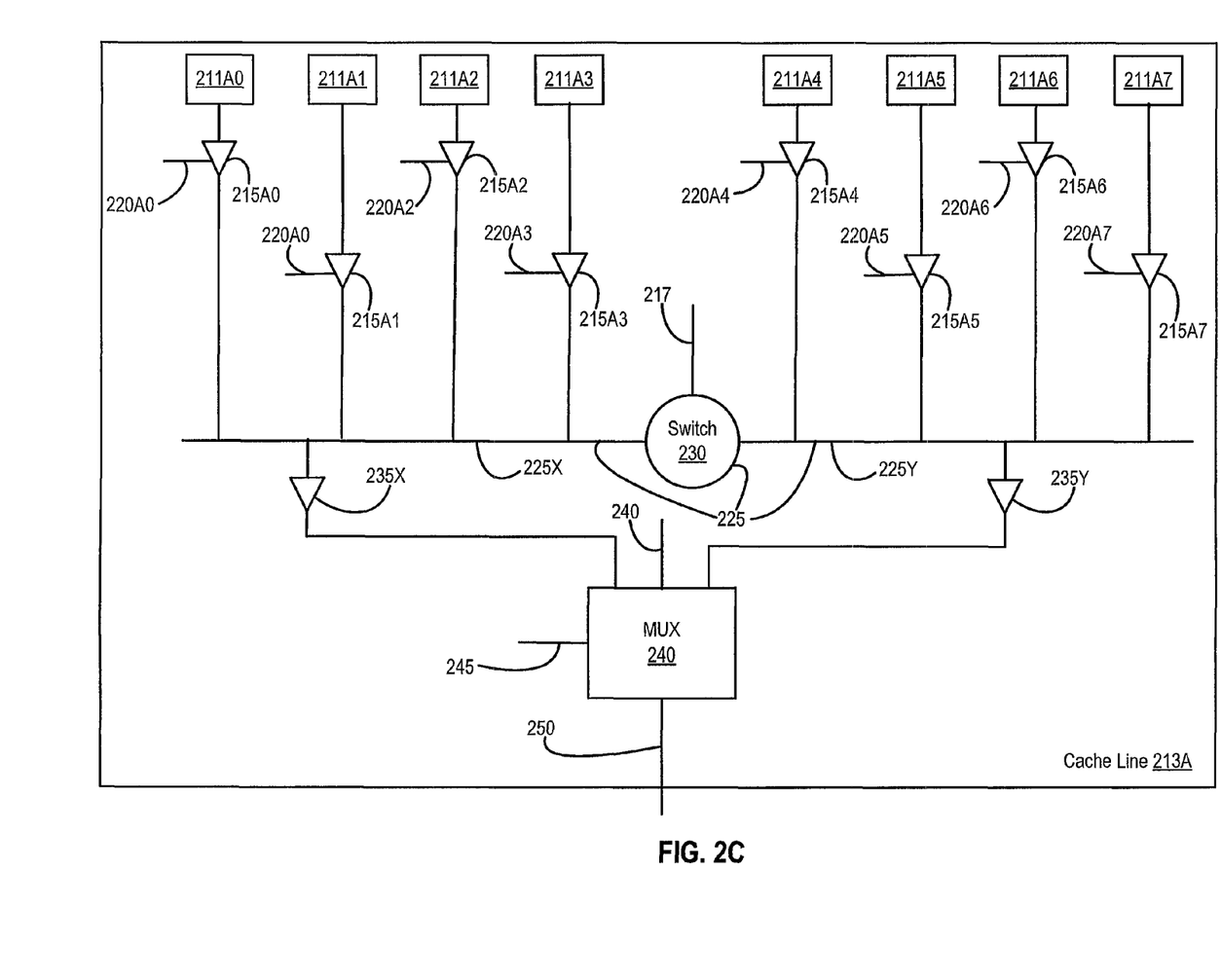
FIG. 2C provides a block diagram of a cache line, according to one or more embodiments.

Turning now to FIG. 2C, a block diagram of a cache line is illustrated, according to one or more embodiments. As shown, a cache line 213A can include cache cells 211A0-211A7. In one or more embodiments, cache lines 213A0-213A7 can include elements and/or features of cache line 213A. In one example, cache line 213A0 can include cache line 213A, and cache cells 212A0-212A7 can correspond to respective cache cells 211A0-211A7.

As illustrated, cache cells 211A0-211A7 can be coupled to respective sense amplifiers (amps) or buffers 215A0-215A7 that can be coupled to a bus 225. Sense amps 215A0-215A7 can receive control signals through respective lines 220A0-220A7 and present data on bus 225 based on respective control signals. As shown, bus 225 can include a switch 230 and bus portions 225X and 225Y. In one or more embodiments, bus 225 can be referred to as a first bus (such as bus portion 225X) coupled to a switch (such as switch 230) coupled to a second bus (such as bus portion 225Y).

In one or more embodiments, switch 230 can receive control signals from line 217 to split bus 225 into portions 225X and 225Y or to aggregate bus 225 as a whole. In one or more embodiments, when bus 225 is split into portions 225X and 225Y, data from one of cache cells 211A0-211A3 can be available on portion 225X and data from one of cache cells 211A4-211A7 can be available on portion 225Y, simultaneously.

Moreover, when bus 225 is split into portions 225X and 225Y, data from a cache cell can be available sooner on a respective bus portion than the data from the cache cell can be available on bus 225 as a whole. Accordingly, a setup time can be reduced when bus 225 is split into portions 225X and 225Y. In one or more embodiments, data for a SIMD operation can be arranged in cache cells 211A0-211A7 such that data destined for floating point unit (FPU) 260A can be stored in one of cache cells 211A0-211A3 and data destined for FPU 260B can be stored in one of cache cells 211A4-211A7. In one or more embodiments, the data destined for FPU 260A and the data destined for FPU 260B can be accessed by a same memory address.

As shown, bus portions 225X and 225Y can be coupled to a multiplexor (MUX) 240 via respective sense amps 235X and 235Y. MUX 240 can receive control signals through MUX control line 245, and MUX 240 can output a selected input through an output line or bus 250. In one or more embodiments, MUX output 250 can be coupled to bus 254 through an output port of cache 210. As illustrated, MUX 240 can include a third input 240. In one or more embodiments, input 240 can be present for testing purposes.

Figure 2D:
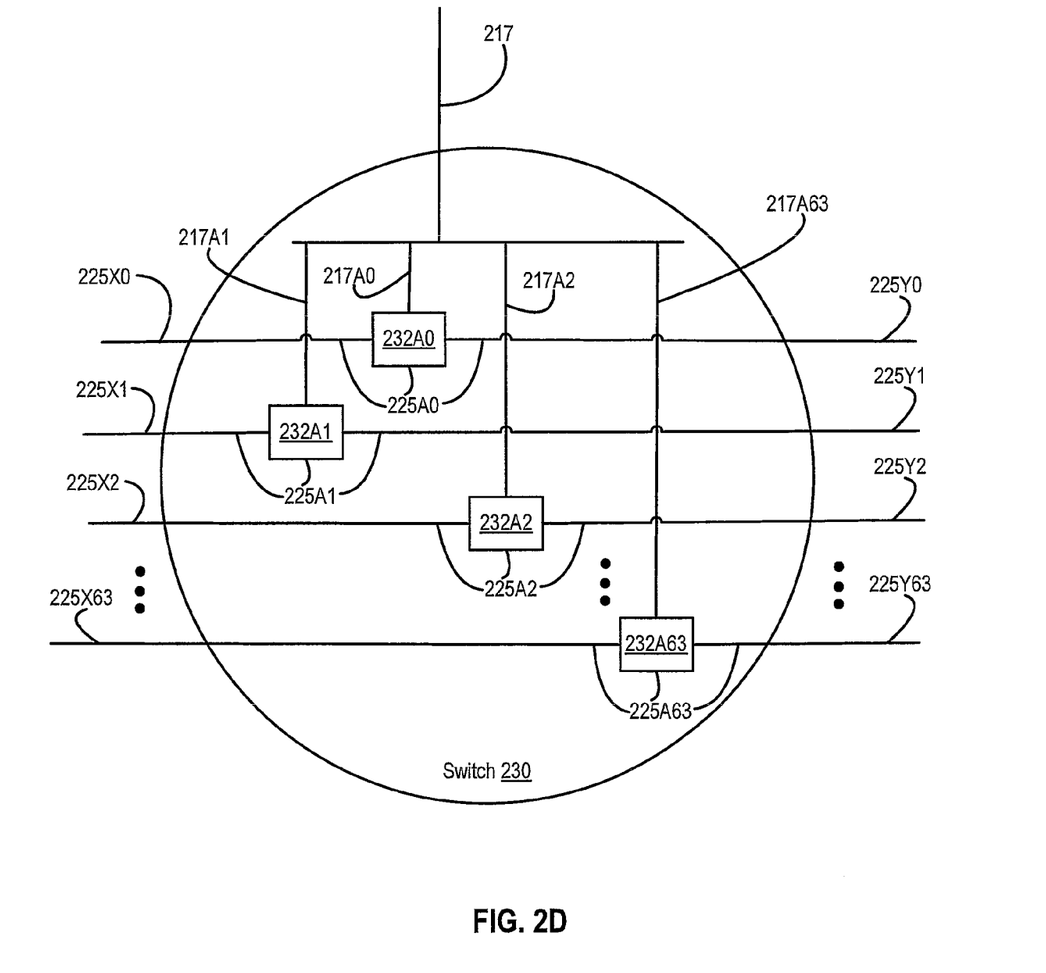
FIG. 2D provides a block diagram of a switch of a bus, according to one or more embodiments.

Turning now to FIG. 2D, a block diagram of a switch of a bus is illustrated, according to one or more embodiments. In one or more embodiments, a switch of a bus can include multiple switches coupled to multiple respective bus lines. For example, a bus, e.g., bus 225, can include sixty-four one-bit bus lines that can include sixty-four one-bit bus line switches that can be included in switch 230. For instance, bus 225 can communicate eight bytes of data through sixty-four one-bit bus lines. As shown for exemplary illustrative purposes, one-bit bus lines 225A0-225A2 and 225A63 include one-bit bus line portions 225X0-225X2 and 225X63 of bus portion 225X, one-bit bus portions lines 225Y0-225Y2 and 225Y63 of bus portion 225Y, and switches 232A0-232A2 and 232A63 of switch 230 coupled to respective one-bit bus line portions 225X0-225X2 and 225X63 and coupled to respective one-bit bus portions lines 225Y0-225Y2 and 225Y63.

As illustrated, switches 232A0-232A2 and 232A63 are coupled to respective control signal lines 217A0-217A2 and 217A63 which are coupled to control signal line 217. Each of control signal lines 217A1-217A2 and 217A63 can control splitting or aggregating of a one-bit bus line of bus 225 through a respective electrically controlled switch. For example, electrically controlling switches 232A0-232A2 and 232A63 can include applying an appropriate amount of current and/or voltage to respective control signal lines 217A0-217A2 and 217A63. In one or more embodiments, splitting a one-bit bus line can include reducing or eliminating connectivity and/or conductivity through the switch of the one-bit buts line and aggregating the one-bit bus line can include increasing or providing connectivity and/or conductivity through the switch of the one-bit buts line.

In one or more embodiments, the switch of the one bit bus line of bus 225 can include a field effect transistor (FET), and an appropriate electrical signal received through the control line can cause the FET of switch to reduce or eliminate connectivity and/or conductivity between one-bit bus line portions 225X and 225Y or can cause the FET of the switch to increase or provide connectivity and/or conductivity between one-bit bus line portions 225X and 225Y. In one example, switch 232A0 can include a FET, and an appropriate voltage signal received through control signal line 217A0 can cause the FET of switch 232A0 to reduce or eliminate connectivity and/or conductivity between one-bit bus line portions 225X0 and 225Y0. In a second example, switch 232A0 can include a FET, and an appropriate voltage signal received through control signal line 217A0 can cause the FET of switch 232A0 to increase or provide connectivity and/or conductivity between one-bit bus line portions 225X0 and 225Y0. In the two examples, for instance, a gate of the FET can be coupled to control signal line 217A0 and one-bit bus line portions 225X0 and 225Y0 can be respectively coupled to a drain and a source of the FET or one-bit bus line portions 225X0 and 225Y0 can be respectively coupled to a source and a drain of the FET.

In one or more embodiments, the switch of the one bit bus line of bus 225 can include a solid-state relay, and an appropriate electrical signal received through the control line can cause the solid-state relay of switch to reduce or eliminate connectivity and/or conductivity between one-bit bus line portions 225X and 225Y or can cause the solid-state relay of the switch to increase or provide connectivity and/or conductivity between one-bit bus line portions 225X and 225Y. In one example, switch 232A0 can include a solid-state relay, and an appropriate electrical signal received through control signal line 217A0 can cause the solid-state relay of switch 232A0 to reduce or eliminate connectivity and/or conductivity between one-bit bus line portions 225X0 and 225Y0. In a second example, switch 232A0 can include a solid-state relay, and an appropriate electrical signal received through control signal line 217A0 can cause the solid-state relay of switch 232A0 to increase or provide connectivity and/or conductivity between one-bit bus line portions 225X0 and 225Y0.

Figure 3:
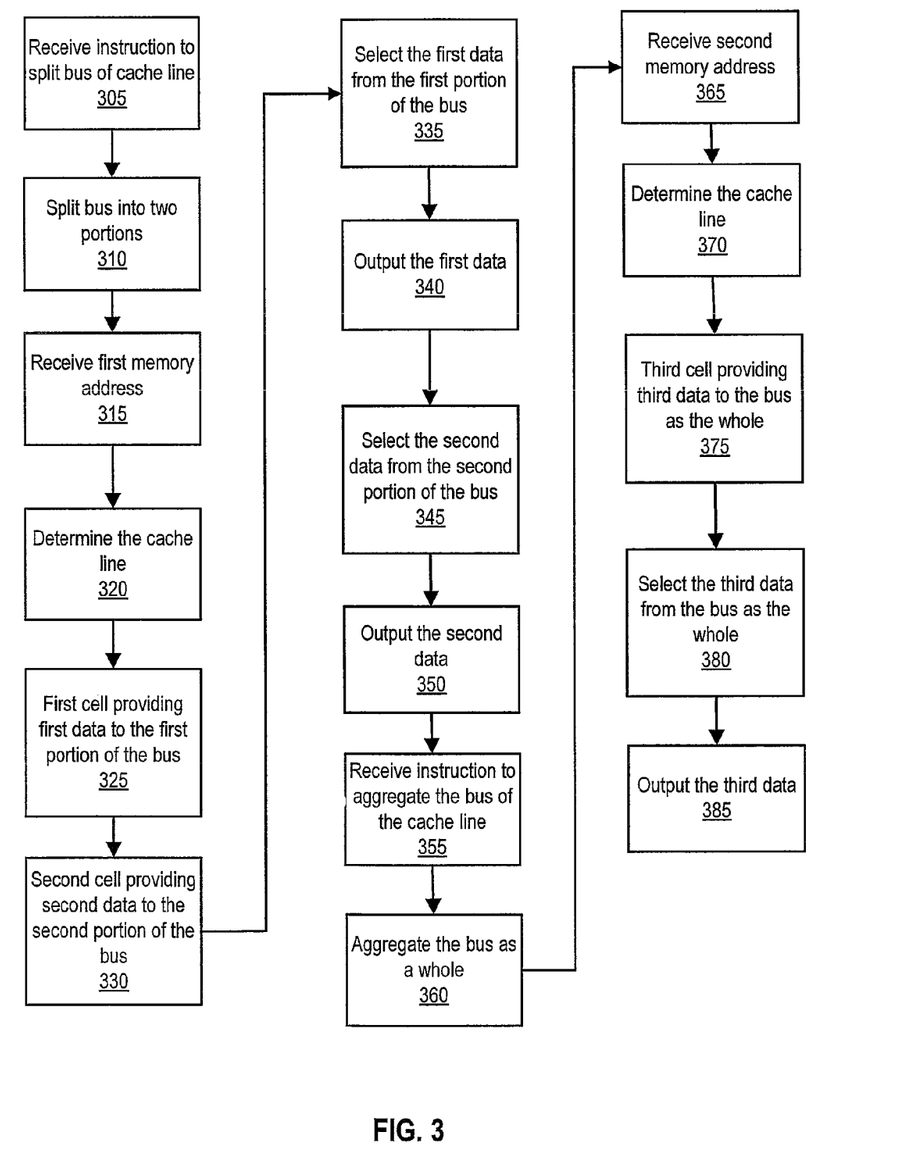
FIG. 3 illustrates a method for operating a cache system, according to one or more embodiments.

Turning now to FIG. 3, a method for operating a cache system is illustrated, according to one or more embodiments. The method begins at block 305 where cache 210 receives an instruction or signal to split a bus of a cache line into two portions. In one or more embodiments, a processor system has at least one SIMD instruction to process and instructs cache 210 to split the bus of the cache line into two portions.

For exemplary purposes to describe the method illustrated in FIG. 3, the cache line can include cache line 213A0, and cache line 213A0 can include elements, features, and/or functionality of cache line 213A. Other cache lines can be utilized, as well, as described in the method of FIG. 3. At block 310, cache 210 splits bus 225 into bus portions 225X and 225Y. At block 315, cache 210 receives a first memory address and determines cache line 213A0 corresponding to the first memory address at block 320. At block 325, a first cache cell (e.g., a cache cell of cache cells 211A0-211A3) provides first data to bus portion 225X, where the first data corresponds to the first memory address. At block 330, a second cache cell (e.g., a cache cell of cache cells 211A4-211A7) provides second data to bus portion 225Y, where the second data corresponds to the first memory address. For example, the second data can correspond to an odd offset of the first memory address, as well. For instance, the offset can correspond to a size of a data type (e.g., a data type being accessed). In one example, the data type can include a floating point data type, where the floating point data type includes a size of eight bytes. For instance, the odd offset can include the first memory address plus eight bytes.

At block 335, MUX 240 selects the first data from bus portion 225X, and MUX 240 outputs the first data via MUX output 250 at block 340. In one or more embodiments, cache 210 outputs the first data from MUX output 250 to FP registers 260. At block 345, MUX 240 selects the second data from bus portion 225Y, and MUX 240 outputs the second data via MUX output 250 at block 350. In one or more embodiments, cache 210 outputs the second data from MUX output 250 to FP registers 260.

At block 355, cache 210 receives an instruction or signal to aggregate bus 225 as a whole, and cache 210 aggregates bus 225 as the whole at block 360. At block 365, cache 210 receives a second memory address, and cache 210 determines cache line 213A0 which corresponds to the second memory address at block 370. At block 375, a third cache cell (e.g., a cache cell of cache cells 211A0-211A7) provides third data to bus 225, where the third data corresponds to the second memory address. At 380, MUX 240 can select the third data from bus 225 and output the third data via MUX output 250 at block 385. In one or more embodiments, cache 210 outputs the third data from MUX output 250 to FP registers 260.

Figure 4:
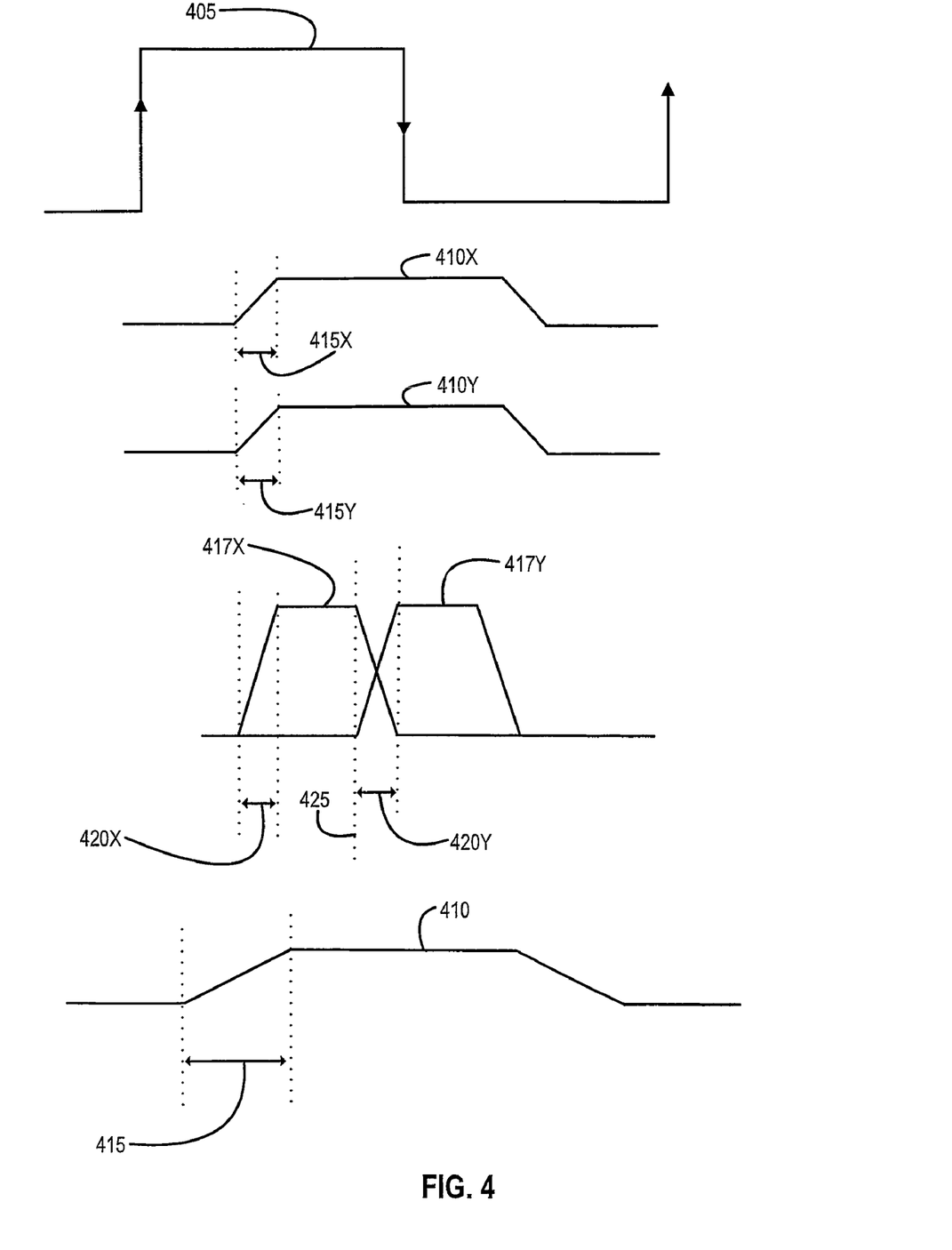
FIG. 4 illustrates an exemplary timing diagram representation of data communication, according to one or more embodiments.

Turning now to FIG. 4, a timing diagram representation of data communication is illustrated, according to one or more embodiments. In one or more embodiments, cache 210 can receive a clock signal 405 that can allow cache 210 to coordinate with other devices of a processor system. For example, clock signal 405 can allow cache 210 to coordinate communications with other devices of a processor system.

Data availability curve 410X illustrates when the first data is available (e.g., stable) on bus portion 225X when bus 225 is split into bus portions 225X and 225Y. Similarly, data availability curve 410Y illustrates when the second data is available (e.g., stable) on bus portion 225Y when bus 225 is split into bus portions 225X and 225Y. In one or more embodiments, the first data and the second data are available on respective bus portions 225X and 225Y after respective setup times 415X and 415Y.

As described above, MUX 240 can select the first data and provide the first data as output to MUX output 250. The first data can be available through MUX output 250 after a MUX setup time 420X as shown with reference to data availability curve 417X. In one or more embodiments, MUX setup time 420X can be associated with setup time 425X. For example, MUX setup time 420X can include an amount of time transpiring that includes setup time 425X if MUX 240 selects data from bus portion 225X before a start of setup time 415X. In one or more embodiments, FP registers 260 can receive the first data from cache 210 after the first data is available through MUX output 250.

As described above, MUX 240 can select the second data and provide the second data via MUX output 250. The second data can be available through MUX output 250 after a MUX setup time 420Y as shown with reference to data availability curve 417Y. As illustrated, MUX setup time 420Y starts at MUX timing point 425 which is a time where MUX 240 receives a control signal through MUX control line 245 to select the second data from bus portion 225Y. In one or more embodiments, FP registers 260 can receive the second data from cache 210 after the second data is available through MUX output 250. In one or more embodiments, MUX timing point 425 can be coordinated with FP registers 260 such that FP registers 260 can receive both the first data and the second data within the clock cycle illustrated, and FP registers 260 can store the first data and the second data in respective first and second registers of FP registers 260. As shown, cache 210 can output the first data and the second data in a serial fashion within one clock cycle, and FP registers 260 can receive the first data and the second data in a serial fashion and store the first data and the second data in two respective registers within one clock cycle.

Data availability curve 410 illustrates when the third data is available (e.g., stable) on bus 225 when bus 225 is aggregated as a whole. The third data is available on bus portions 225 after setup time 415. In one or more embodiments, setup time 415 can be greater than setup time(s) 415X and/or 415Y. In one example, bus 225 includes more capacitance than either bus portion 225X or bus portion 225Y, since bus 225 includes both bus portions 225X and 225Y. The increased capacitance can increase the setup time. As described above, MUX 240 can select the third data and provide the third data via MUX output 250. Cache 210 can output the third data, and FP registers 260 can receive the third data and store the third data in a register.

Figure 5:
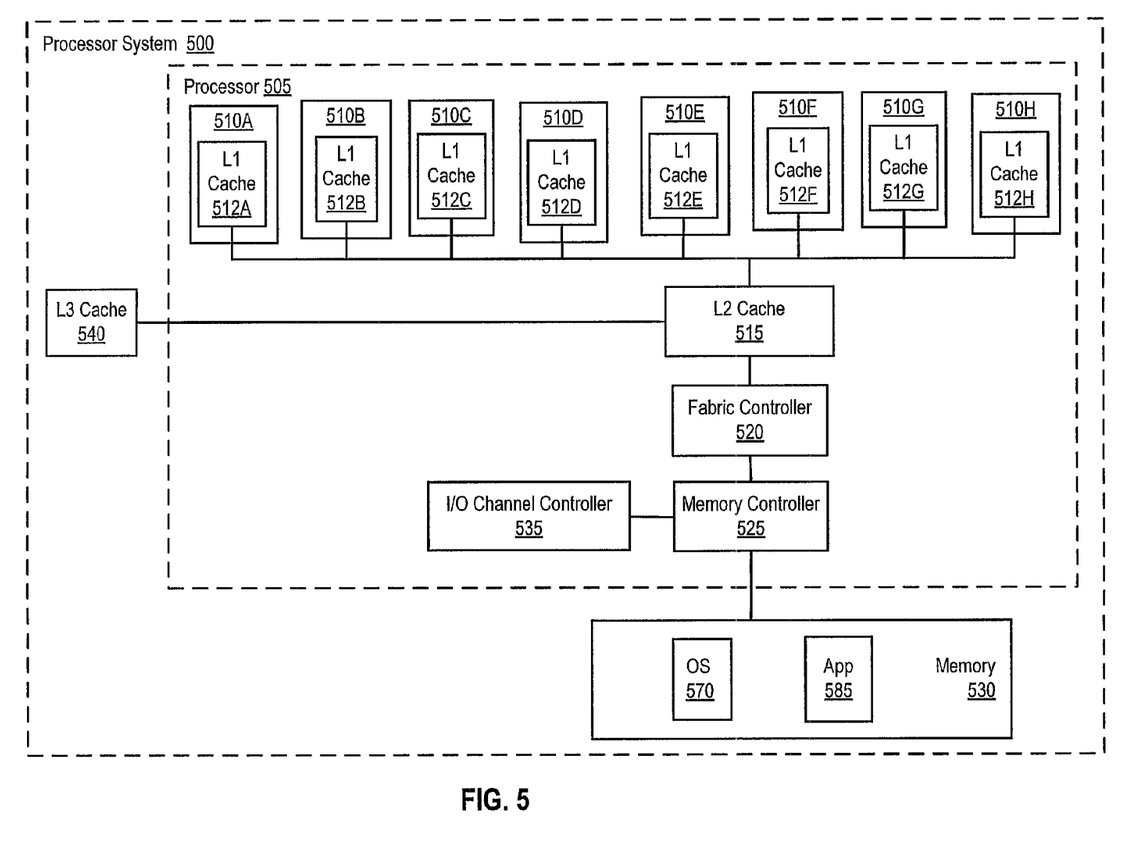
FIG. 5 provides a block diagram representation of a superscalar processor system, according to one or more embodiments.

Turning now to FIG. 5, there is depicted a block diagram representation of a superscalar processor system, according to one or more embodiments. As is illustrated, a processor system 500 includes at least one chip-level multiprocessor (CMP) 505 (only one of which is illustrated in FIG. 5), each of which includes one or more processors 510A-510H (e.g., cores). In one or more embodiments, CMP 505 can correspond to a node (or a portion of a node) of a supercomputing system or high-performance computing (HPC) cluster.

Processors 510A-510H can, for example, operate in a multithreading (MT) mode or a single thread (ST) mode. When processors 510A-510H operate in the MT mode, processors 510A-510H can employ multiple separate instruction fetch address registers to store program counters for multiple threads. In one or more embodiments, each of processors 510A-510H include a respective first level (L1) cache memory 512A-512H that is coupled to a shared second level (L2) cache memory 515, which is coupled to a shared third level (L3) cache memory 540 and a fabric controller 520 which can be operable to support an interconnect fabric by which processor 505 can communicate with and share data with other processors.

In one or more embodiments, one or more of processors 510A-510H can include a cache system such as the cache system described above with reference to cache 210. In one example, processor 510A can include cache 210, bus 254, FP registers 260, buses 255A and 255B, and FPUs 260A and 260B. In one or more embodiments, cache 210 can be implemented and/or included in L1 cache 512A, L2 cache 515, or L3 cache 540 such that the features and/or functionality of cache 210 are implemented and/or included. One or more other processors 510B-510H can implement and/or include the features and/or functionality of processor 510A, as well.

As is illustrated, fabric controller 520 is coupled to a memory controller (e.g., included in a Northbridge) 525, which is coupled to a memory subsystem 530. For example, memory subsystem 530 can provide storage where data and/or processor instructions/code can be stored and/or retrieved. In one or more embodiments, memory subsystem 530 can include a random access memory and/or computer system memory such as DRAM, SRAM, EDO RAM, Rambus RAM, NVRAM, EPROM, EEPROM, flash memory, etc. Memory subsystem 530 can include other types of memory as well, or combinations thereof. Memory subsystem 530 includes an application appropriate amount of volatile and/or non-volatile memory. For example, memory subsystem 530 can include an amount of volatile and/or non-volatile memory to store utility or application 585 and/or operating system (OS) 570 such that application 585 and/or OS 585 can be executed by processor 505.

In one or more embodiments, fabric controller 520 can be omitted and, in this case, the L2 cache 515 can be directly connected to memory controller 525. Fabric controller 520, when implemented, can facilitate communication between different CMPs and between processors 510A-510H and memory subsystem 530 and can function as in interface in this manner.

It should be appreciated that the various techniques disclosed herein are equally applicable to systems that employ separate L2 caches for each of processors 510A-510H, as well as systems that employ separate L2 and L5 caches for each of processors 510A-510H. Each of the L1, L2, and L3 caches can be combined instruction and data caches or correspond to separate instruction and data caches. As is shown in FIG. 5, memory controller 525 can also be coupled to an I/O channel controller (e.g., included in a Southbridge) 535.

In one or more embodiments, I/O channel controller 535 can provide connectivity and control for one or more input devices and/or one or more output devices. For one example, the one or more input devices can include a pointing device (e.g., mouse) and/or a keyboard, among others. In another example, the one or more output devices can include a display, among others. Additionally, a multimedia drive (e.g., compact disk read/write (CDRW), digital video disk (DVD) drive, etc.) and/or an USB (universal serial bus) port can be coupled to I/O channel controller 535. The Multimedia drive and the USB port enable insertion of a removable storage device (e.g., optical disk, "thumb" drive, etc.) on which data/instructions/code can be stored and/or from which data/instructions/code can be retrieved. Furthermore, I/O channel controller 535 can be coupled to various non-volatile memory such as a magnetic media, e.g., a hard drive, floppy drive, etc., where data/instructions/code can be stored and/or from where data/instructions/code can be retrieved. In one or more embodiments, I/O channel controller 535 can be coupled to a network interface (e.g., a wired network interface, a wireless network interface, etc.) that can be coupled to a network (e.g., a local area network, a wide area network, a public network such as an Internet, etc.).

In one or more embodiments, data types other than a floating type can be used, and arithmetic logic units (ALUs) can be used where FPUs are presented. For example, some other data types can include integer, character, pointer, and/or byte data types, among others.

In the flow chart(s) above, one or more of the methods and/or processes are embodied in a computer readable medium including computer readable code such that a series of steps are performed when the computer readable code is executed (by a processing unit). In one or more embodiments, some processes of the methods and/or processes can be combined, performed simultaneously, concurrently (e.g., scheduled quickly enough in time to appear simultaneous to a person), or in a different order, or perhaps omitted, without deviating from the spirit and scope of the invention. Thus, while the method(s) and/or process(es) are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, the present invention may be embodied as a method, process, system, and/or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," "logic", and/or "system." Furthermore, the present invention may take the form of an article of manufacture having a computer program product with a computer-usable storage medium having computer-executable program instructions/code embodied in or on the medium.

As will be further appreciated, the method(s) and/or process(es) in embodiments of the present invention may be implemented using any combination of software, firmware, microcode, and/or hardware. As a preparatory step to practicing the invention in software, the programming code (whether software or firmware) will typically be stored in one or more machine readable storage or memory mediums such as fixed (hard) drives, diskettes, magnetic disks, optical disks, magnetic tape, semiconductor memories such as RAMs, ROMs, PROMs, EPROMs, EEPROMs, etc., thereby making an article of manufacture, in one or more embodiments. The medium may be electronic, magnetic, optical, electromagnetic, infrared, or semiconductor system (or apparatus or device) or a propagation medium. Further, the medium may be any apparatus that may include, store, communicate, propagate, or transport the program for use by or in connection with the execution system, apparatus, or device. The method(s) and/or process(es) disclosed herein may be practiced by combining one or more machine-readable storage devices including the code/logic according to the described embodiment(s) with appropriate processing hardware to execute and/or implement the code/logic included therein. In general, the term computer, computer system, or data processing system can be broadly defined to encompass any device having a processor (or processing unit) which executes instructions/code from a memory medium.

While the invention has been described with reference to exemplary embodiments, it will be understood by those skilled in the art that various changes may be made and equivalents may be substituted for elements thereof without departing from the scope of the invention. In addition, modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, use of the terms first, second, etc. can denote an order if specified, or the terms first, second, etc. can be used to distinguish one element from another without an ordered imposed.

What is claimed is:

1. A cache system, comprising:
    a plurality of cache lines;
    wherein a first cache line of the plurality of cache lines includes:
        a plurality of cache cells;
        a bus coupled to the plurality of cache cells, wherein the bus includes a switch that is operable to receive a first control signal and to split the bus into a first portion and a second portion without conductivity therebetween in response to a first state of the first control signal and to aggregate the bus into a whole in which the first portion and the second portion have conductivity therebetween in response to a second state of the first control signal; and
        a multiplexor coupled to the bus;
    wherein, when the bus is split, a first cache cell of the plurality of cache cells is coupled to the first portion of the bus and a second cache cell of the plurality of cache cells is coupled to the second portion of the bus;
    wherein a first input and a second input of the multiplexor are coupled to the bus such that, when the bus is split, the first input is coupled to the first portion of the bus and the second input is coupled to the second portion of the bus; and
    wherein the multiplexor is operable to receive a second control signal and to output first data from the first portion of the bus in response to a first state of the first control signal and to output second data from the second portion of the bus in response to a second state of the second control signal.

2. The cache system of claim 1, wherein:
    the bus includes a plurality of one-bit bus lines;
    the switch includes a plurality of one-bit bus line switches each corresponding to a respective one of the plurality of one-bit bus lines; and
    each one-bit bus line of the plurality of one-bit bus lines includes a respective one-bit bus line switch of the plurality of one-bit bus line switches that is operable to receive the first control signal and to split the one-bit bus line into a first portion and a second portion without conductivity therebetween in response to a first state of the first control signal and to aggregate the one-bit bus line into a whole in which the first portion and second portion have conductivity therebetween in response to a second state of the first control signal.

3. The cache system of claim 2, wherein each one-bit bus line switch of the plurality of one-bit bus line switches includes a field effect transistor (FET).

4. The cache system of claim 2, wherein each one-bit bus line switch of the plurality of bus line switches includes a solid-state relay.

5. The cache system of claim 1, wherein:
    the cache system is operable to receive a memory address and to determine that the first cache line corresponds with the memory address;
    when the bus is split, the first cache cell stores the first data and the second cache cell stores the second data, wherein each of the first data and the second data is associated with the memory address; and
    when the bus is split, the cache system is operable to output the first data and the second data in a serial fashion in one clock cycle of a processor system.

6. The cache system of claim 5, wherein to output the first data and the second data in the serial fashion in one clock cycle of the processor system, the cache system is further operable to:
    split the bus into the first portion and the second portion;
    control the multiplexer to select the first data from the first portion of the bus;
    output the first data through an output port of the cache system;
    control the multiplexer to select the second data from the second portion of the bus; and
    output the second data through the output port of the cache system.

7. The cache system of claim 5, wherein to output the first data and the second data in the serial fashion in one clock cycle of the processor system, the cache system is further operable to output the first data and the second data to a register file.

8. The cache system of claim 1, wherein the first data and the second data correspond to a floating point data type.

9. A method for operating a cache system including a cache line, wherein the cache line has a plurality of cache cells and the cache system further includes a bus for the cache line, the method comprising:
    receiving a first control signal, and responsive thereto, splitting the bus into a first portion and a second portion without conductivity therebetween if the first control signal has a first state, and if the first control signal has a second state, aggregating the bus into a whole in which the first portion and the second portion have conductivity therebetween, wherein a first cache cell of the plurality of cache cells in the cache line is coupled to the first portion of the bus and a second cache cell of the plurality of cache cells in the cache line is coupled to the second portion of the bus;

in response to the first control signal indicating to split the bus of the cache line:
  the first cache cell providing first data to the first portion of the bus and the second cache cell providing second data to the second portion of the bus;
  in response to a second control signal having a first state, selecting the first data from the first portion of the bus and outputting the first data through a port of the cache system; and
  in response to the second control signal having a second state, selecting the second data from the second portion of the bus and outputting the second data through the port of the cache system.

10. The method of claim 9, further comprising:
in response to the first control signal having the second state indicating to aggregate the bus of the cache line:
  the first cache cell of the plurality of cache cells providing third data to the bus;
  selecting the third data from the bus in response to the second control signal and outputting the third data through the port of the cache system.

11. The method of claim 10, wherein:
the bus includes a switch operable to split the bus into the first portion and the second portion and to alternatively aggregate the bus as the whole; and
said splitting the bus into the first portion and the second portion includes the switch splitting the bus into the first portion and the second portion.

12. The method of claim 11, wherein:
the bus includes a plurality of one-bit bus lines;
the switch includes a plurality of one-bit bus line switches each corresponding to a respective one of the plurality of one-bit bus lines;
the splitting includes each one-bit bus line switch of the plurality of one-bit bus line switches splitting the corresponding one-bit bus line into a first portion and a second portion if the first control signal has the first state; and
the aggregating includes each one-bit bus line switch of the plurality of one-bit bus line switches aggregating the corresponding one-bit bus line into a whole if the first control signal has the second state.

13. The method of claim 9, wherein:
the cache system includes a multiplexor with a first input coupled to the first portion of the bus and a second input coupled to the second portion of the bus when the bus is split into the first portion and the second portion;
said selecting the first data from the first portion of the bus includes the multiplexor selecting the first data from the first portion of the bus; and
said selecting the second data from the second portion of the bus includes the multiplexor selecting the second data from the second portion of the bus.

14. The method of claim 9, wherein the first cache cell providing the first data to the first portion of the bus, the second cache cell providing the second data to the second portion of the bus, said selecting the first data from the first portion of the bus, said outputting the first data through the port of the cache system, said selecting the second data from the second portion of the bus, said outputting the second data through the port of the cache system is performed in one clock cycle of a processor system.

15. A processor system, comprising:
a processor; and
a cache coupled to the processor;
wherein the cache includes a plurality of cache lines, wherein a cache line among the plurality of cache lines includes:
  a plurality of cache cells;
  a bus coupled to the plurality of cache cells, wherein the bus includes a switch that is operable to receive a first control signal and to split the bus into a first portion and a second portion without conductivity therebetween in response to a first state of the first control signal and to aggregate the bus into a whole in which the first portion and the second portion have conductivity therebetween in response to a second state of the first control signal; and
  a multiplexor coupled to the bus;
wherein, when the bus is split, a first cache cell of the plurality of cache cells is coupled to the first portion of the bus and a second cache cell of the plurality of cache cells is coupled to the second portion of the bus;
wherein a first input and a second input of the multiplexor are coupled to the bus such that, when the bus is split, the first input is coupled to the first portion of the bus and the second input is coupled to the second portion of the bus; and
wherein the multiplexor is operable to receive a second control signal and to output first data from the first portion of the bus in response to a first state of the first control signal and to output second data from the second portion of the bus in response to a second state of the second control signal.

16. The processor system of claim 15, wherein:
the bus includes a plurality of one-bit bus lines;
the switch includes a plurality of one-bit bus line switches each corresponding to a respective one of the plurality of one-bit bus lines; and
each one-bit bus line of the plurality of one-bit bus lines includes a respective one-bit bus line switch of the plurality of one-bit bus line switches that is operable to receive the first control signal and to split the one-bit bus line into a first portion and a second portion without conductivity therebetween in response to a first state of the first control signal and to aggregate the one-bit bus line into a whole in which the first portion and second portion have conductivity therebetween in response to a second state of the first control signal.

17. The processor system of claim 16, wherein each one-bit bus line switch of the plurality of one-bit bus line switches includes a field effect transistor (FET).

18. The processor system of claim 15, wherein:
the cache system is operable to receive a memory address and to determine that the first cache line corresponds with the memory address;
when the bus is split, the first cache cell stores the first data and the second cache cell stores the second data, wherein each of the first data and the second data is associated with the memory address; and
when the bus is split, the cache system is operable to output the first data and the second data in a serial fashion in one clock cycle of a processor system.

19. The processor system of claim 18, wherein to output the first data and the second data in the serial fashion in one clock cycle of the processor system, the cache is further operable to:

split the bus into the first portion and the second portion;

control the multiplexor to select the first data from the first portion of the bus;

output the first data through an output port of the cache system to a register file of the processor;

control the multiplexer to select the second data from the second portion of the bus; and output the second data through the output port of the cache to the register file of the processor.

* * * * *